United States Patent Office 3,123,536
Patented Mar. 3, 1964

3,123,536
PREPARATION OF L-GLUTAMIC ACID BY FERMENTATION

Shinji Okumura, Yokohama City, Ryuichiro Tsugawa, Tokyo, Toshinao Tsunoda, Zushi City, Shinichi Motozaki, Tokyo, Tadashi Suyama, Kawasaki City, and Seizo Kanao, Tokyo, Japan, assignors to Ajinomoto Co., Inc., and Sanraku Distillers Co., Inc., Tokyo, Japan
No Drawing. Filed Oct. 22, 1962, Ser. No. 232,276
Claims priority, application Japan July 12, 1960
7 Claims. (Cl. 195—29)

This invention relates to the preparation of L-glutamic acid, and more particularly to the bacterial fermentation of a culture medium containing an assimilable carbon compound, an assimilable nitrogen compound, and small amounts of certain inorganic salts and other compounds well known to be beneficial or essential to fermentative production of L-glutamic acid under aerobic conditions.

We have found that the production of glutamic acid in the fermentation process is improved when certain pelargonic acid derivatives are present in the culture medium.

Suitable pelargonic acid derivatives include the following compounds:

(a) 7,8-diaminopelargonic acid (hereinafter referred to by the symbol DAPA)

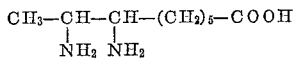

(b) 8-keto-7-aminopelargonic acid (hereinafter referred to as KAPA)

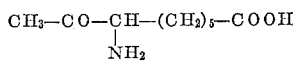

(c) 8-amino-7-ketopelargonic acid (hereinafter referred to as AKPA)

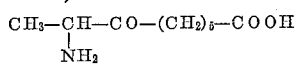

(d) 7,8-diketopelargonic acid (hereinafter referred to as DKPA)

$$CH_3-CO-CO-(CH_2)_5-COOH$$

(e) 7-amino-8-hydroxypelargonic acid (hereinafter referred to as HAPA)

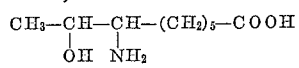

The pelargonic acid derivatives are admixed to the culture medium as free acids, or as salts with acids or bases. Crystallized derivatives are preferred and the following compounds are representative of crystalline materials used in the process of our invention:

DAPA dihydrochloride, M.P. 210° C.
DAPA sulfate, M.P. 270° C.
KAPA hydrochloride, M.P. 110–112° C.
AKPA hydrochloride, M.P. 135–139° C.
DKPA (free acid), M.P. 50–51° C.
Ammonium salt of HAPA, M.P. 84° C.

The amounts of pelargonic acid derivatives to be added to a culture medium vary with the nature of the microorganisms employed, and with the concentration of the assimilable carbon compound or carbon source which is preferably a carbohydrate, such as a sugar. The pelargonic acid derivative is preferably added last when a culture medium is prepared by mixing its ingredients prior to sterilization at elevated temperature. The quantity of pelargonic acid derivatives that will give the highest yields of glutamic acid must be determined experimentally for any given set of conditions but the following concentration limits will be found to apply in most instances:

DAPA _____ micrograms per liter __ 5–1000
KAPA _____ milligrams per liter __ 1–10
AKPA _____ micrograms per liter __ 100–1000
DKPA _____ milligrams per liter __ 5–50
HAPA _____ do ____ 10–1000

The several pelargonic acid derivatives of the invention may be employed jointly in mixtures and the necessary amounts of individual compounds in the mixtures may be estimated from the values listed above.

The admixture of the pelargonic acid derivatives to a culture medium including 10 percent sugar as a carbon source permits a 50 percent yield of L-glutamic acid to be attained with 40 hours.

The relationship between the concentration of pelargonic acid derivative of the invention and the L-glutamic acid yield will be apparent from the test results tabulated in Tables I to VIII. These results were obtained by cultivating the several microorganisms identified in the presence of the listed concentrations of pelargonic acid derivatives on a culture medium prepared as described hereinafter in Example I. In addition to the pelargonic acid derivative, the culture medium contained:

Glucose _____ 10 percent.
$KH_2PO_4$ _____ 0.1 percent.
$MgSO_4 \cdot 7H_2O$ _____ 0.04 percent.
Fe and Mn ions _____ 2 p.p.m. each.
"Mieki" (total nitrogen 2.4
 g./dl.) _____ 0.1 milliliter per deciliter.
Thiamine hydrochloride ____ 200 micrograms per liter.
Urea _____ 0.9 to 2.7 percent.

"Mieki" is a commercial seasoning or flavoring mixture obtained as a by-product in the preparation of L-glutamic acid by hydrolysis of soy bean protein. It is essentially a mixture of amino acids. After shaking the culture 40 hours at 31° C., growth of the microorganisms was determined by measuring the absorbancy of a sample of the fermentation broth after dilution with 25 volumes of water at a wavelength of 562 millimicrons. The absorbancy A was determined as follows:

$$A = \log T_{water} - \log T_{sample}$$

wherein:

$T = I/I_0$
I is the intensity of the transmitted light, and
$I_0$ is the intensity of the incident light.

Residual glucose and L-glutamic acid are expressed in these tables as a percentage of the glucose weight originally present. The microorganisms employed in the tests represented by Table I to V were *Brevibacterium flavum*, ATCC No. 14067, and *Brevibacterium lactofermentum*, ATCC No. 13869. The several pelargonic acid derivatives were used in the form of the crystalline compounds listed above, DAPA being used in the form of the dihydrochloride.

TABLE I

| DAPA, Micrograms/ Liter | Brevibacterium flavum | | | Brevibacterium lactofermentum | | |
|---|---|---|---|---|---|---|
| | Absorbency A | Residual Glucose, percent | Glut. Acid, percent | Absorbency A | Residual Glucose, percent | Glut. Acid, percent |
| 0 | 0.13 | 83.1 | 5.7 | 0.12 | 76.1 | 5.0 |
| 10 | 0.13 | 82.0 | 5.7 | 0.13 | 77.8 | 7.4 |
| 50 | 0.26 | 66.3 | 18.8 | 0.28 | 58.0 | 18.6 |
| 100 | 0.43 | 23.0 | 36.7 | 0.45 | 31.9 | 32.3 |
| 200 | 0.71 | 0.0 | 46.1 | 0.64 | 0.0 | 48.1 |
| 500 | 0.75 | 0.0 | 36.3 | 0.85 | 0.2 | 41.6 |
| 1,000 | 0.96 | 1.2 | 8.7 | 0.94 | 0.3 | 21.6 |

TABLE II

| KAPA, Milligrams/ Liter | Brevibacterium flavum | | | Brevibacterium lactofermentum | | |
|---|---|---|---|---|---|---|
| | Absorbency A | Residual Glucose, percent | Glut. Acid, percent | Absorbency A | Residual Glucose, percent | Glut. Acid, percent |
| 0 | 0.03 | 89.9 | 3.0 | 0.09 | 74.3 | 4.3 |
| 1 | 0.21 | 68.8 | 10.7 | 0.18 | 66.7 | 12.9 |
| 3 | 0.38 | 41.9 | 25.4 | 0.54 | 30.6 | 26.9 |
| 4 | 0.46 | 28.8 | 44.3 | 0.64 | 6.2 | 44.5 |
| 5 | 0.55 | 8.7 | 50.0 | 0.73 | 0.5 | 41.4 |
| 8 | 0.65 | 1.5 | 41.3 | 0.77 | 1.5 | 34.2 |
| 10 | 0.70 | 0.0 | 34.3 | 0.85 | 0.7 | 29.7 |

TABLE III

| DKPA, Milligrams/ Liter | Brevibacterium flavum | | | Brevibacterium lactofermentum | | |
|---|---|---|---|---|---|---|
| | Absorbency A | Residual Glucose, percent | Glut. Acid, percent | Absorbency A | Residual Glucose, percent | Glut. Acid, percent |
| 0 | 0.1 | 78.0 | 7.3 | 0.04 | 91.3 | 2.8 |
| 5 | 0.23 | 53.2 | 17.9 | 0.19 | 65.6 | 11.7 |
| 10 | 0.34 | 44.6 | 20.4 | 0.27 | 51.6 | 22.0 |
| 15 | 0.48 | 27.2 | 23.9 | 0.35 | 37.8 | 31.7 |
| 20 | 0.54 | 8.4 | 37.2 | 0.42 | 26.2 | 34.8 |
| 25 | 0.68 | 0.0 | 43.1 | 0.49 | 12.0 | 41.1 |
| 30 | 0.74 | 0.1 | 41.3 | 0.56 | 3.2 | 46.6 |

TABLE IV

| AKPA, Micrograms/ Liter | Brevibacterium flavum | | | Brevibacterium lactofermentum | | |
|---|---|---|---|---|---|---|
| | Absorbency A | Residual Glucose, percent | Glut. Acid, percent | Absorbency A | Residual Glucose, percent | Glut. Acid, percent |
| 0 | 0.04 | 91.3 | 2.8 | 0.10 | 78.0 | 7.3 |
| 100 | 0.17 | 74.6 | 10.3 | 0.21 | 67.8 | 10.5 |
| 300 | 0.26 | 41.9 | 22.3 | 0.41 | 13.0 | 33.0 |
| 500 | 0.35 | 28.1 | 31.5 | 0.62 | 0.3 | 49.0 |
| 600 | | | | 0.66 | 0.3 | 51.3 |
| 800 | 0.56 | 1.2 | 49.5 | | | |
| 1,000 | 0.63 | 0.3 | 45.6 | 0.85 | 0.3 | 43.7 |

TABLE V

| HAPA, Milligrams/ Liter | Brevibacterium flavum | | | Brevibacterium lactofermentum | | |
|---|---|---|---|---|---|---|
| | Absorbency A | Residual Glucose, percent | Glut. Acid, percent | Absorbency A | Residual Glucose, percent | Glut. Acid, percent |
| 2 | | | | 0.15 | 79.0 | 7.5 |
| 50 | 0.23 | 5.0 | 20.9 | 0.24 | 64.0 | 12.5 |
| 200 | 0.54 | 4.3 | 48.8 | 0.44 | 59.0 | 21.7 |
| 400 | 0.66 | 0.0 | 33.7 | 0.66 | 3.7 | 37.2 |
| 500 | | | | 0.72 | 1.3 | 35.4 |
| 1,000 | 0.71 | 1.2 | 12.3 | 0.80 | 2.3 | 23.4 |

TABLE VI

[Brevibacterium saccharolyticum ATCC No. 14066]

| Pelargonic Acid Derivative | | Absorbency A | Residual Glucose, percent | Glutamic Acid, percent |
|---|---|---|---|---|
| Symbol | Micrograms per Liter | | | |
| DAPA | 150 | 0.59 | 4.3 | 41.3 |
| AKPA | 400 | 0.63 | 2.3 | 42.3 |
| KAPA | 6,000 | 0.65 | 0.3 | 45.3 |
| DKPA | 30,000 | 0.56 | 5.9 | 41.6 |
| HAPA | 300,000 | 0.61 | 10.1 | 38.9 |

TABLE VII

[Brevibacterium immariophilium, ATCC No. 14068]

| Pelargonic Acid Derivative | | Absorbency A | Residual Glucose, percent | Glutamic Acid, percent |
|---|---|---|---|---|
| Symbol | Micrograms per Liter | | | |
| DAPA | 200 | 0.66 | 3.9 | 24.3 |
| AKPA | 400 | 0.60 | 4.5 | 28.7 |
| KAPA | 5,000 | 0.67 | 3.2 | 30.0 |
| DKPA | 30,000 | 0.58 | 4.1 | 26.3 |
| HAPA | 300,000 | 0.68 | 2.0 | 27.1 |

TABLE VIII

[Brevibacterium roseum, ATCC No. 13825]

| Pelargonic Acid Derivative | | Absorbency A | Residual Glucose, percent | Glutamic Acid, percent |
|---|---|---|---|---|
| Symbol | Micrograms per Liter | | | |
| DAPA | 150 | 0.59 | 3.2 | 48.9 |
| AKPA | 500 | 0.69 | 1.6 | 50.1 |
| KAPA | 5,000 | 0.61 | 0.2 | 45.3 |
| DKPA | 25,000 | 0.66 | 4.2 | 46.6 |
| HAPA | 300,000 | 0.70 | 0.1 | 43.6 |

Improved yields of glutamic acid in the presence of our pelargonic acid derivatives can also be obtained with other micro organisms known to transform glucose into L-glutamic acid but best results are obtained with several species of Brevibacterium including *Brev. kawasakii*, *Brev. flavum*, *Brev. lactofermentum*, *Brev. roseum*, *Brev. immariophilium*, *Brev. saccharolyticum*, *Brev. aquapile*, and *Brev. divaricatum*. Other microorganisms which produce increased amounts of glutamic acid in the presence of the pelargonic acid derivatives belong to the genera Corynebacterium, Microbacterium and Micrococcus.

Glucose may be replaced as a carbon source by sucrose, fructose, maltose, starch hydrolysate, refined molasses, fumaric and citric acids and their salts or mixtures thereof. Preferred nitrogen sources include urea, ammonia water and gaseous ammonia. Phosphate, potassium, magnesium, iron and manganese ions are usually necessary for the growth of the microorganisms. Thiamine and amino acids are beneficial. The fermentation is preferably carried out under aerobic conditions. For operation on an industrial scale, the hydrogen ion concentration of the aqueous medium is held between pH 7 and 9, and the temperature between 28° C. and 37° C.

The following examples are further illustrative of the present invention but it will be understood that the invention is not limited thereto:

Example 1

A culture medium was prepared to contain 10.2% glucose, 0.1% $K_2HPO_4$, 0.04% $MgSO_4 7H_2O$, 2 p.p.m. each of Fe and Mn in the form of their sulfates, 0.1 ml./dl. "Mieki" (total nitrogen 2.4 g./dl.), 200 micrograms thiamine hydrochloride and 200 micrograms DAPA dihydrochloride per liter. The pH was adjusted to 7.0.20 ml. batches of the medium were each poured into a shaking flask of 500 ml. capacity, and sterilized by steam heating. 0.4 ml. of a sterilized solution containing 450 g. urea per liter were then added to each flask and the mixture was inoculated with *Brevibacterium lactofermentum*, strain ATCC No. 13869. The culture was shaken at 31° C. under aerobic conditions at a frequency of 120 r.p.m. with an amplitude of 7 cm. The pH of the culture medium dropped to 7.0 after 16 hours, and 0.4 ml. of additional urea solution were admixed. The pH again dropped to 7.0 after 6 hours and 0.4 ml. urea solution were again added. Fermentation was interrupted after 40 hours.

The combined broth from the several flasks contained 4.91 grams L-glutamic acid per deciliter. One liter of the broth was sterilized, and the bacterial cells were filtered off. The filtrate was concentrated in vacuo and adjusted to pH 3.2 with hydrochloric acid. 41.5 grams crude L-glutamic acid crystallized from the concentrate.

*Example II*

The fermentation process of Example I was repeated, but DAPA dihydrochloride was replaced by an equal amount of DAPA sulfate. Additions of 0.4 ml. urea solution were made after 16 hours cultivation, and again after 23 hours. Fermentation was stopped after a total time of 40 hours. The concentration of L-glutamic acid in the fermentation broth was 4.85 g./dl., and 40.8 grams of crude glutamic acid crystals were recovered in the same manner as in Example I.

*Example III*

The fermentation process of Example I was repeated, but *Brevibacterium flavum*, ATCC No. 14067, was employed instead of *Brevibacterium lactofermentum*. 0.6 and 0.4 ml. urea solution were added 12 and 20 hours after inoculation respectively. The fermentation was interrupted after a total time of 40 hours. The broth contained 4.70 g./dl. L-glutamic acid, 40.0 grams crude L-glutamic acid crystals were recovered from one liter of the broth.

*Example IV*

When DAPA dihydrochloride was replaced by an equal weight of DAPA sulfate in the process of Example III, additions of 0.6 and 0.4 ml. of urea solution had to be made after 13 and 20 hours respectively. After 40 hours fermentation, 4.57 g./dl. L-glutamic acid were found in the broth. 37.8 g. crystals of crude L-glutamic acid were obtained from one liter of broth in the same manner as in Examples I to III.

*Example V*

An aqueous culture medium was prepared to contain 10.0% glucose, 0.1% $KH_2PO_4$, 0.04% $MgSO_4.7H_2O$, 2 p.p.m. each of Fe and Mn ions, 0.1 ml./dl. "Mieki" (total nitrogen 2.4 g./dl.), 200 micrograms per liter thiamine hydrochloride, and 5 mg./l. KAPA hydrochloride. 20 ml. batches of the medium were poured into shaking flasks of 500 ml. capacity, and were sterilized by steam heating. 0.4 ml. of a sterilized solution containing 45 g./dl. urea were added to each culture medium which was then inoculated with a culture of *Brevibacterium flavum*, ATCC No. 14067. The flasks were shaken at 31° C. at an amplitude of 7 cm. and a frequency of 120 r.p.m. under aerobic conditions.

The pH of the culture media dropped to 7.0 after 16 hours, and 0.6 ml. of the urea solution were added to each flask. A second addition was made after 24 hours when the pH again dropped to 7.0. Fermentation was stopped after a total time of 40 hours. The fermentation broth contained 5.03 g./dl. L-glutamic acid. When one liter of the fermentation broth was treated as in Example I, 43.5 g. crude L-glutamic acid was obtained in crystalline form.

*Example VI*

The fermentation process of Example I was repeated except for the replacement of DAPA dihydrochloride by 4 mg./l. KAPA hydrochloride. 0.4 ml. urea solution were added 17 hours, and again 24 hours after inoculation. After 40 hours, fermentation was interrupted, and 4.69 g./dl. L-glutamic acid were found in the broth. 40 g. of crude crystals of the acid were recovered from one liter of the broth in the manner of Example I.

*Example VII*

The process of Example V was modified by the use of 800 micrograms AKPA hydrochloride per liter instead of KAPA. 0.3 ml. urea solution were added 24 hours after inoculation. After a total fermentation period of 40 hours, 5.10 g./dl. L-glumtamic acid were found in the fermentation broth by analysis, and 44.7 grams of crude crystals were recovered from one liter of the broth.

*Example VIII*

A fermentation run was carried out in the manner of Example V, but 600 micrograms AKPA hydrochloride were substituted for the KAPA used there, and additions of 0.4 ml. and 0.5 ml. urea solutions were made 15 and 22 hours respectively after inoculation for which *Brevibacterium lactofermentum* was employed. After 40 hours fermentation, 5.25 g./dl. of L-glutamic acid had formed in the broth, and 45.8 g. of crude crystals of L-glutamic acid were recovered.

*Example IX*

The fermentation process of Example V was repeated, but 25 mg./l. DKPA were substituted for KAPA hydrochloride, and *Brevibacterium lactofermentum*, ATCC No. 13869 was used. After 40 hours of fermentation, the broth contained 4.39 g./dl. L-glutamic acid. When one liter of the broth was treated as in Example I, 38.2 grams of crude crystals were obtained.

*Example X*

When carried out in the presence of 30 mg./l. DKPA instead of KAPA hydrochloride, the fermentation process of Example V yielded a broth containing 4.6 g./dl. L-glutamic acid. 39.1 grams of crude crystals of the acid were obtained from one liter of the broth.

*Example XI*

*Brevibacterium lactofermentum*, ATCC No. 13869 when used in the process of Example V in the presence of 400 mg./l. of the ammonium salt of HAPA instead of *Brevibacterium flavum* and KAPA hydrochloride produced 3.72 g./dl. L-glutamic acid in the broth within 40 hours. 32.5 grams crude L-glutamic acid were crystallized from one liter of the broth.

*Example XII*

Replacement of the KAPA hydrochloride in the process of Example V by 200 mg./l. ammonium salt of HAPA gave a fermentation broth containing 4.87 g./dl. L-glutamic acid. One liter of the broth, when treated as in Example I, gave 41.5 grams crystals of crude L-glutamic acid.

*Example XIII*

Starch was hydrolyzed in the presence of sulfuric acid to yield a liquid containing 10.0 g./dl. reducing sugar (glucose equivalent). A culture medium was prepared from the neutralized hydrolysate by the addition of 0.1% $KH_2PO_4$, 0.04% $MgSO_4.7H_2O$, 2 p.p.m. each of Fe and Mn ions, 0.1 ml./dl. "Mieki," 200 micrograms thiamine hydrochloride and 200 micrograms DAPA dihydrochloride per liter. Twenty milliliter batches of the medium were placed in 500 ml. shaking flasks and sterilized by steam heating. 0.4 ml. of a sterilized aqueous solution containing 45 g./dl. urea were added to each batch which was then seeded with a culture of *Brevibacterium lactofermentum* ATCC No. 13655.

The fermentation was carried out aerobically under shaking at a temperature betwen 28 and 35° C. The pH value of the medium dropped to 7.0 after 12 hours, and 0.4 ml. of the urea solution were added to each flask. Twenty hours after inoculation, further 0.4 ml. urea solution were added so that the pH of the solution was maintained between 7.0 and 9.0. The fermentation was stopped after 40 hours when the concentration of L-glutamic acid in the fermentation broth had reached 4.6 g./dl. One liter of the broth was sterilized, and bacterial cells were filtered off. The filtrate was concentrated in vacuo, adjusted to pH 3.2 with hydrochloric acid, and permitted to crystallize. 38.2 grams crude L-glutamic acid were recovered as crystals.

We have further found that the amount of DAPA employed in the fermentation can be reduced by about 90% for equal results if sterilization of DAPA in the presence of the carbon source is avoided. The tests whose results are represented by the figures of Table I were modified in such a manner that DAPA dihydrochloride was separately dissolved in a portion of the water used in making up the culture medium, and the solution was sterilized separately from the mixture of glucose and minor ingredients. The results shown in Table IX were obtained.

TABLE IX

| DAPA, Micrograms/ Liter | Brevibacterium flavum | | | Brevibacterium lactofermentum | | |
| --- | --- | --- | --- | --- | --- | --- |
| | Absorbency A | Residual Glucose, percent | Glut. Acid, percent | Absorbency A | Residual Glucose, percent | Glut. Acid, percent |
| 0 | 0.08 | 86.1 | 2.8 | 0.06 | 84.3 | 3.1 |
| 5 | 0.24 | 62.1 | 18.9 | 0.25 | 50.3 | 21.5 |
| 10 | 0.51 | 0.3 | 50.3 | 0.53 | 2.1 | 49.8 |
| 20 | 0.58 | 0.7 | 41.0 | 0.59 | 0.6 | 37.0 |
| 30 | 0.66 | 0.1 | 29.3 | 0.64 | 0.9 | 32.6 |
| 50 | 0.76 | 0.0 | 19.0 | 0.80 | 0.1 | 21.3 |
| 500 | 0.89 | 0.0 | 7.0 | 0.92 | 0.0 | 6.3 |

When the above data are compared with those shown in Table I, it is seen that the effectiveness of DAPA dihydrochloride is increased tenfold or more by separate sterilization. 5 micrograms of DAPA dihydrochloride when sterilized separately have about the same effect as 50 micrograms of the same compound sterilized jointly with the carbon source. The yield of glutamic acid with 10 micrograms per liter DAPA dihydrochloride is slightly better than that with 200 micrograms of the same compound sterilized jointly with the carbon source. This effect is not limited to the microorganisms employed in the tests reported on in Table IX, as will be appreciated by comparing the results of Table X with the corresponding ones of Tables VI to VIII. The tests on which these tables are based were identical except for the method of sterilizing the DAPA dihydrochloride.

TABLE X

| Microorganism | DAPA Micrograms/ Liter | Absorbency A | Residual Glucose, percent | Glutamic Acid, percent |
| --- | --- | --- | --- | --- |
| Brev. saccharolyticum ATCC No. 14066. | 12 γ/l | 0.60 | 0.2 | 48.3 |
| Brev. immariophilium ATCC No. 14068. | 7 γ/l | 0.59 | 2.9 | 32.5 |
| Brev. roseum ATCC No. 13825. | 13 γ/l | 0.62 | 0.1 | 47.9 |

The advantages of sterilizing DAPA separately from other constituents of the culture medium will be appreciated from the following examples.

*Example XIV*

An aqueous solution was prepared to contain 10.2% glucose, 0.1% $KH_2PO_4$, 0.04% $MgSO_4.7H_2O$, 2 p.p.m. each of Mn and Fe as $MnSO_4$ and $FeSO_4$ respectively, 0.1 ml./dl. "Mieki" (total nitrogen 2.4 g./dl.), and 200 micrograms of thiamine per liter. The pH of the solution was adjusted to 7.0. 20 ml. batches of the solution were poured into respective 500 ml. shaking flasks, and sterilized by steam heating. An aqueous solution of 0.2 microgram DAPA hydrochloride in one milliliter of water was separately sterilized and added to each flask at room temperature. Each culture medium thus contained 10 micrograms DAPA dihydrochloride per liter. A urea solution containing 45 g. urea per deciliter was sterilized and 0.4 ml. thereof were added last. The completed culture medium was then inoculated with a culture of *Brevibacterium lactofermentum*, ATCC No. 13869, and fermentation was permitted to proceed at 31° C. under aerobic conditions with shaking at 120 r.p.m. at an amplitude of 7 cm. When the pH dropped to 7.0 after 16 hours, 0.4 ml. of the urea solution were added to each flask, and the addition was repeated six hours later.

The concentration of L-glutamic acid reached a maximum of 4.98 g./dl. after 40 hours when the fermentation was stopped. The broth was then sterilized and bacterial cells were filtered. When the filtrate was concentrated in vacuo and adjusted to a pH of 3.2 with hydrochloric acid, 42.0 grams crude L-glutamic acid crystallized.

*Example XV*

The fermentation of Example XIV repeated with *Brevibacterium flavum*, ATCC No. 14067 instead of *Brevibacterium lactofermentum*. After 12 and 20 hours respectively from the inoculation of the culture medium, 0.6 and 0.4 ml. of the urea solution were added to raise the pH from 7.0. After 40 hours of total fermentation time, the concentration of glutamic acid in the broth was 5.20 g./dl. 44.0 grams of crude L-glutamic acid crystals were obtained from one liter of the broth.

Commercial DAPA, DAPA dihydrochloride, or DAPA sulfate are normally practically sterile. When DAPA or a salt thereof is dissolved in sterile water, the practically sterile solution may be admixed to the sterilized remainder of a culture medium to obtain results not significantly different from those of Examples XIV or XV.

This application is a continuation-in-part of our copending applications Serial Nos. 123,121, filed July 11, 1961, and Serial No. 140,672, filed September 26, 1961, both now abandoned.

While the invention has been described with particular reference to specific embodiments, it is to be understood that it is not limited thereto, but is to be construed broadly and restricted solely by the scope of the appended claims.

What we claim is:

1. A process for preparing L-glutamic acid which comprises fermenting an aqueous medium containing a carbon source and a nitrogen source by means of glutamic acid producing bacteria selected from the group which consists of the genera Brevibacterium, Corynebacterium, Microbacterium, and Micrococcus, under aerobic conditions in the presence of a derivative of pelargonic acid selected from the group consisting of 7,8-diaminopelargonic acid, 8-keto-7-aminopelargonic acid, 8-amino-7-ketopelargonic acid, 7,8-diketopelargonic acid, and 7-amino-8-hydroxypelargonic acid.

2. A process as set forth in claim 1 wherein said derivative of pelargonic acid is 7,8-diaminopelargonic acid.

3. A process as set forth in claim 1 wherein said derivative of pelargonic acid is 8-keto-7-aminopelargonic acid.

4. A process as set forth in claim 1 wherein said derivative of pelargonic acid is 8-amino-7-ketopelargonic acid.

5. A process as set forth in claim 1 wherein said derivative of pelargonic acid is 7,8-diketopelargonic acid.

6. A process as set forth in claim 1 wherein said derivative of pelargonic acid is 7-amino-8-hydroxypelargonic acid.

7. A process for preparing L-glutamic acid which comprises:

(a) preparing a sterile aqueous medium containing a carbon source and a nitrogen source;

(b) preparing a substantially sterile solution of 7,8-diaminopelargonic acid;
(c) adding a sufficient amount of said solution to said medium to produce a mixture containing between 5 micrograms and 100 micrograms 7,8-diaminopelargonic acid per liter of said mixture;
(d) inoculating said mixture with glutamic acid producing batceria selected from the group consisting of the genera Brevibacterium, Corynebacterium, Microbacterium, and Micrococcus; and
(e) fermenting the inoculated mixture under aerobic conditions.

References Cited in the file of this patent

UNITED STATES PATENTS

| | | |
|---|---|---|
| 2,910,409 | Fried et al. | Oct. 27, 1959 |
| 3,002,889 | Kinoshita et al. | Oct. 3, 1961 |

FOREIGN PATENTS

| | | |
|---|---|---|
| 245,673 | Switzerland | Aug. 16, 1947 |

OTHER REFERENCES

Swain: Journal of the Chemical Society (London), 1948, part II, pages 1552–1554.